United States Patent

Dattilo

[15] 3,692,314

[45] Sept. 19, 1972

[54] MOUNTING ARRANGEMENT FOR MAGNETIC TAPE HEAD

[72] Inventor: Donald J. Dattilo, Mt. Prospect, Ill.

[73] Assignee: Motorola, Inc., Franklin Park, Ill.

[22] Filed: April 1, 1971

[21] Appl. No.: 130,350

[52] U.S. Cl. ....................274/4 A

[51] Int. Cl. ....................G11b 21/08

[58] Field of Search ....................274/4 R, 4 A, 11 A; 179/100.2 CA

[56] References Cited

UNITED STATES PATENTS

| | | | |
|---|---|---|---|
| 3,457,556 | 7/1969 | Kelly | 179/100.2 CA |
| 2,560,569 | 7/1951 | Hare | 179/100.2 CA |
| 3,530,584 | 11/1950 | Pontius | 179/100.2 CA |
| 3,278,694 | 10/1966 | Pastor et al. | 274/4 A |

*Primary Examiner*—Harry N. Haroian
*Attorney*—Vincent J. Rauner and R. J. La Porte

[57] ABSTRACT

An assembly for mounting a magnetic tape head in a cartridge type tape player includes a block mountable for vertical movement, a collar to which the tape head is fixedly mounted joined to the mounting block for rotational movement with respect thereto and a retainer spring connected to the collar to secure the collar to the block. An adjustment screw extends through the block into engagement with a tab on the collar for rotating the collar against or in the direction of a biasing force also provided by the retainer spring, to position the collar including the tape head, rotationally with respect to the block.

8 Claims, 5 Drawing Figures

INVENTOR:
DONALD J. DATTILO
BY: Ronald J. La Porte
ATTORNEY.

MOUNTING ARRANGEMENT FOR MAGNETIC TAPE HEAD

BACKGROUND OF THE INVENTION

This invention relates generally to tape players using multi-track tape cartridges and more particularly to an assembly employed in such a tape player for mounting the magnetic tape head used for playing the multi-track tape cartridges.

In the case of cartridge type tape players, it is necessary to mount the magnetic tape head for movement both vertically, to adjust the position of the tape head with respect to the various tracks on the multi-track magnetic tape, and rotatably to align the magnetic pickups of the tape head with the horizontally extending tracks on the tape, while still maintaining the face of the tape head in parallel alignment with the tape.

Many of the tape head mounting assemblies presently used include a first portion to which the tape head is attached for vertical movement and a second portion spaced from and coupled to the first portion which imparts rotational movement through the coupling to the tape head. While the last-mentioned mounting arrangement satisfactorily positions the tape head both vertically and rotationally, it includes many components, is rather complex in design and occupies considerable area within the chassis of the tape player in which it is employed.

SUMMARY OF THE INVENTION

Accordingly, it is an object of the present invention to provide a new and improved mounting assembly for a magnetic tape head.

It is another object of the present invention to provide a mounting assembly for a magnetic tape head which has few parts, is relatively simple in design, requires a minimum area within the tape player in which it is used and which maintains, at all times, the tape head playing face in parallel alignment with respect to the tape being played.

It is yet another object of the present invention to provide a mounting assembly as described which is relatively inexpensive to produce.

Briefly, a preferred embodiment of the magnetic tape head mounting assembly according to the invention includes a collar to which the magnetic tape head is mounted. The collar includes a cylindrical extension portion which is received in a complementary circular aperture extending through a mounting block. The block can be mounted for vertical movement in the tape player and the collar and tape head are rotatable with respect to the block.

A pair of opposing tabs extend from the extension portion of the collar inserted into the block, beyond the end of the block. A retainer spring is compressed and placed between the tabs. The outward force provided upon release of the spring captures the spring between the tabs and maintains the collar and block in a joined position. A free end of the spring engages a shoulder portion of the block to bias the collar against an adjustment screw extending through a threaded opening in the mounting block.

Turning of the screw against or in the direction of the force provided by the biasing spring adjusts the collar rotatably with respect to the block for making an azimuth adjustment of the tape head. Adjustment of the tape head vertically with respect to the tape can be made by moving the block and attached collar linearly as a unit.

DETAILED DESCRIPTION

Figure 1:
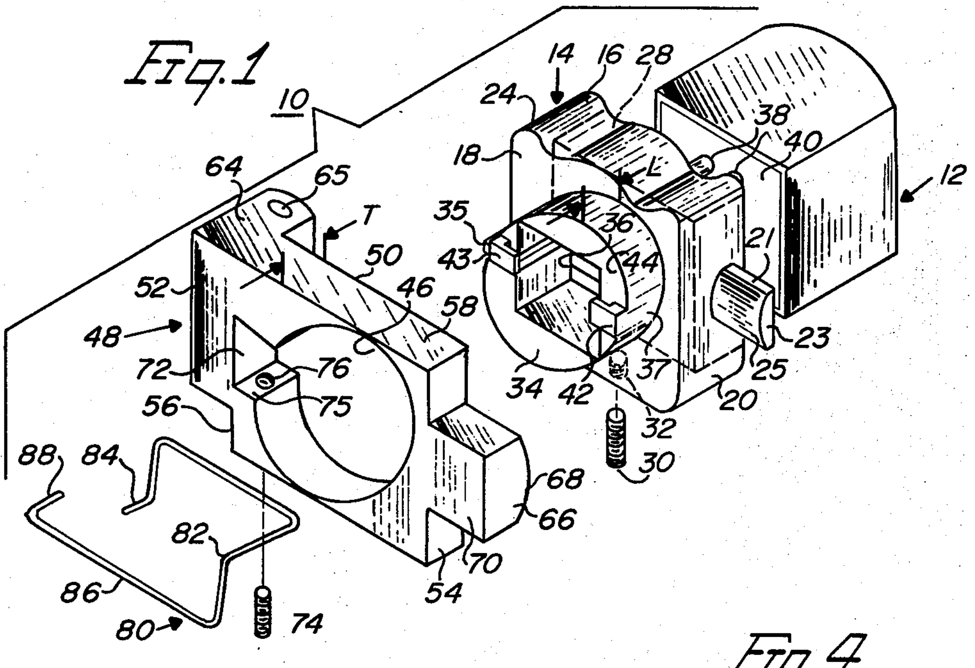
FIG. 1 is an exploded perspective view of a magnetic tape head and tape head mounting assembly according to the invention.
Figure 2:
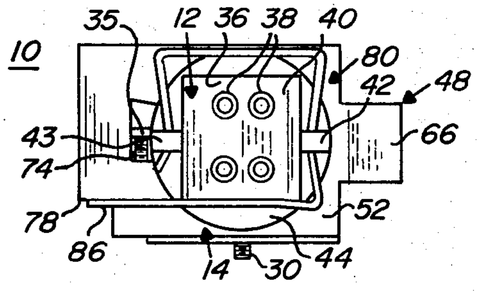
FIG. 2 is a rear view of the tape head and mounting assembly of FIG. 1.

Referring now to the drawing in greater detail wherein like numerals are employed throughout the various views to designate similar components, there is shown in FIG. 1 an exploded view of an assembly 10 according to the invention for mounting a magnetic tape head 12 in a cartridge type tape player.

The mounting assembly 10 includes a collar 14 having a generally rectangular shape including front and rear walls 16, 18, side walls 20, 22, and top and bottom walls 24, 26, respectively. An arm 23 having a flat front surface 21 and a curved rear surface 25 extends outwardly from side wall 20 of the collar. A rectangular opening 28 is provided in front wall 16 of collar 14 for receiving the similarly dimensioned rectangular magnetic tape head 12. A set screw 30 is received in a threaded aperture 32 in bottom wall 26 (see FIG. 4) and tightened into contacting relationship with the side wall 41 of the tape head to maintain the latter in the aperture 28 of collar 14.

A cylindrical portion 34 extends from rear wall 18. A rectangular aperture 36, smaller dimensionally than opening 28, passes through the extension 34 and is in communication with opening 28 in wall 16. Aperture 36 receives the electrical terminals, such as 38, extending from the rear wall 40 of the tape head 12. In use, the aperture 36 accommodates a mating female connector (not shown) to provide electrical circuit connections to the tape head.

A pair of opposing L-shaped tabs 42, 43, extend from the exterior or end wall 44 of the extensions 34. A smaller tab 35 extends from the cylindrical wall 37 of the extension 34. The function of the tabs 42, 43 and tab 35 will be described hereinafter.

The mounting assembly 10 includes also a mounting block 48 having a circular aperture 46 in which extension portion 34 of collar 14 is received for rotation therein. The block 48 also has a generally rectangular shape with front and rear walls 50, 52, side walls 54, 56 and top and bottom walls 58, 60, respectively. The thickness "T" (FIG. 1) of block 48 is equal to the length "L" of extension 34 of the collar so that upon receipt of extension 34 in aperture 46, the end wall 44 of the former lies in the same plane as the rear wall 52 of the block.

Figures 4, 5:
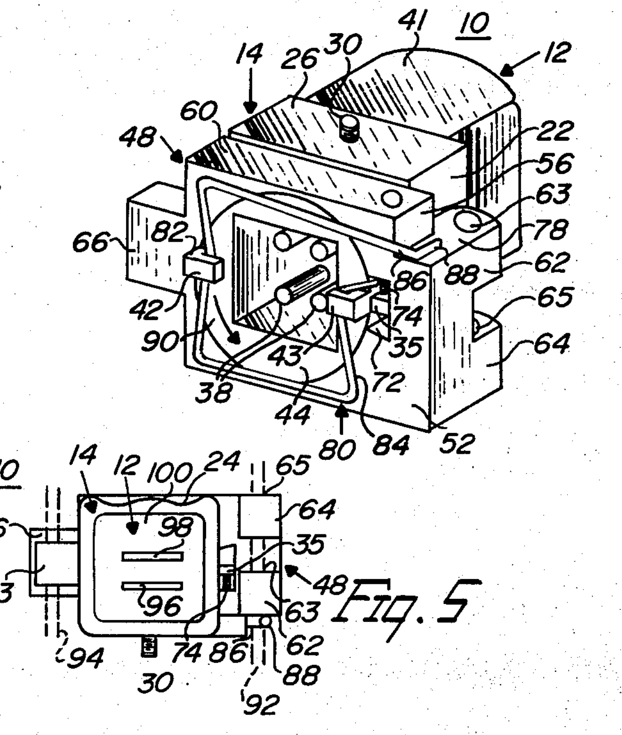
FIG. 4 is a rear, isometric view of the tape head and mounting assembly of the previously described figures, shown in an assembled condition.
FIG. 5 is a front view of the tape head and mounting assembly of the previous figures as it appears mounted for movement on a pair of parallel, vertically extending mounting pins.

A pair of arms 62, 64 (FIG. 4) extend forwardly from and are formed integrally with and at the intersection of front and side walls 50, 56 (see FIG. 4). The arms include aligned apertures 63, 65, respectively, and, as will be explained in greater detail hereinafter, aid in the mounting of block 48 for vertical movement in a cartridge type tape player.

Another arm 66, extends outwardly from the side wall 54 of the block 48. Arm 66 has a curved forward facing surface 68 and a flat rear surface 70 lying along the plane of the rear wall 52 of the block.

A cutout or opening 72 extends through block 48 between walls 50, 52, adjacent and in communication with circular aperture 46. An azimuth adjustment screw 74 is received in a threaded aperture 76 extending through the block from wall 60 (FIG. 4) to wall 75 (FIG. 1) and into opening 72. A shoulder portion 78 (FIG. 4) is provided by arm 62 adjacent wall 56. The function of screw 74 and shoulder portion 78 will be described hereinafter.

In addition to collar 14 and block 48, the mounting assembly 10 includes a retaining spring 80. The spring 80 serves a dual purpose. In the first instance, the spring retains the collar and block in a joined condition and secondly provides a resilient biasing force for adjusting the rotational position of collar 14 with respect to bock 48, and consequently for making azimuth adjustments of the tape head 12 when mounted in a tape player.

The spring 80 is formed of a continuous piece of spring metal and is bent to include opposing substantially V-shaped sections 82, 84. A leg 86 of the spring extends from section 82 toward and outwardly beyond section 84, and includes an extreme free end 88 bent at substantially right angles with respect to the leg 86 and generally to the plane of the spring 80.

Figure 3:
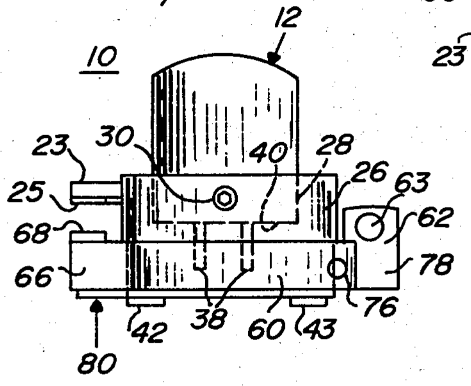
FIG. 3 is a top, plan view of the tape head and mounting assembly of FIGS. 1 and 2.

To assemble the mounting assembly for use with a magnetic tape head in a cartridge type tape player, the extension 34 of the collar 14 is first inserted into circular aperture 46 in block 48. Tab 35 is received in opening 72 and end wall 44 of the extension 34 falls substantially in the same plane as wall 52 of block 48. The curved surfaces 25 and 68 of arms 21 and 66 of the collar and block, respectively, are in opposing relation (FIG. 3), but spaced a predetermined distance from each other. Arms 62, 64 of block 48 extend along side wall 22 of collar 14. The opposing tabs 42, 43 on wall 44 of the extension, extend beyond the plane of walls 52, 54.

To secure the collar and block in a joined position, spring 80 is compressed by pressing sections 82, 84, toward each other. The compressed spring is placed between tabs 42, 43 with the sections 82, 84 in alignment therewith respectively. The spring is then released. Sections 82 and 84 are captured between tabs 42, 43 respectively. The ends of sections 82, 84 lie across end wall 44 of the cylindrical extension of collar 14, and wall 52 of block 48, thereby preventing the removal of extension 34 from circular opening 46.

The free end 88 of leg 86 of the spring 80 rests on shoulder portion 78 of block 48 (FIG. 4). The resiliency of leg 86 of the spring provides a biasing force, tending to rotate the collar in the direction of arrow 90 (FIG. 4) so that tab 35 of collar extension 34 engages adjustment screw 74 protruding into the opening 72.

The magnetic tape head 12 is received in the opening 28 in collar 14 as mentioned heretofore, and the screw 30 is tightened into engagement with the lower wall 41 thereof (FIG. 4) to secure the tape head therein.

The tape head mounting assembly 10 is mounted for vertical movement in a tape player on a pair of vertically extending, spaced pins 92, 94, (shown in dotted lines in FIG. 5). Pin 52 passes through the aligned apertures 63, 65 in arms 62, 64, respectively, of block 48, to secure the block in sliding relation thereto, and pin 94 extends between the curved surfaces of arms 23 and 66 of collar 14 and block 48, respectively. Movement of the mounting assembly 10 along pins 92, 94 adjusts the tape head 12 including magnetic pole pieces or pickups 96, 98 on the pole face 100 thereof with respect to the various tracks on a multi-track tape (not shown) being played in the tape player. To provide an azimuth adjustment of the tape head; i.e., to adjust the horizontally extending magnetic pickups with respect to the horizontally extending tracks on the magnetic tape, the azimuth adjustment screw 74 is turned. Movement of the screw toward the tab 35 rotates the collar 14 against the tension or force of leg 86 of spring 80, and movement in the opposite direction permits the force provided by leg 86 of the spring to rotate the collar 14, and thus tape head 12, in the opposite direction. Because the axis of rotation of the cylindrical extension 34 of collar 14 extends through the center of tape head 12, substantially perpendicular to the pole face 100 thereof, rotation of the collar effectively rotates the tape head 12 about its center, thereby to adjust accurately, the magnetic pickups 96, 98, with the tape tracks. It should be noted that the pole face of the tape head as shown in the drawings is slightly rounded, but for purposes of explanation, the rotational axis of the tape head is described as being substantially perpendicular to the pole face. For a more detailed explanation of the functioning of a tape head mounting assembly, such as 10 according to the invention, for indexing the tape head in the environment of a cartridge type tape player, reference should be made to copending U.S. Pat. application Ser. No. 108,473, filed Jan. 21, 1971 and assigned to the same assignee as the instant invention.

Thus, the mounting assembly 10 according to the invention provides a relatively simple, compact arrangement for mounting a magnetic tape head in a cartridge type tape player. The assembly provides for easy altitude and/or azimuth adjustment of the tape head with respect to a multi-track magnetic recording tape. Because the vertically moving and rotational components of the assembly are directly joined, the mounting assembly takes up a minimum of space within the chassis of the cartridge tape player. The unique retaining spring, as described heretofore, provides a dual function in maintaining the components of the mounting assembly in a joined or united position as well as to provide the necessary force for adjusting the collar portion of the assembly upon which the tape head is mounted, rotatably with respect to the vertically movable mounting block.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. A mounting assembly for a magnetic tape head having a magnetic pole carrying face, said mounting assembly including in combination: a collar portion to which said tape head is fixedly mounted, said collar portion including an extension having a circular cross section, a central axis of said extension passing through the center of said tape head and being substantially perpendicular to the recording face thereof, a block portion mountable for movement along a predetermined path and including a circular opening complementary to said extension of said collar portion, said extension being received in said opening and rotatable therein, and resilient retaining means maintaining said collar and block portions in a joined position, said retaining means also providing a resilient biasing force for biasing said collar into predetermined rotational positions with respect to said block portion.

2. A mounting assembly as claimed in claim 1 wherein said resilient retaining means includes a spring member releasably fastened to said collar portion to prevent the removal of said extension from the opening in said block portion, said spring member engaging said block portion to provide a biasing force tending to rotate said collar portion in a first direction with respect to said block portion, and wherein said mounting assembly further includes an adjustment member mounted on said block portion and engageable with said collar portion to provide a force against said spring tension, whereby upon moving said member in one direction said collar portion is rotated in said first direction with respect to said block portion and upon moving said member in the opposite direction, said collar portion is rotated in the opposite direction with respect to said block portion.

3. A mounting assembly as claimed in claim 2 wherein the extension of said collar portion includes a pair of opposing tabs, said tabs protruding beyond said block portion subsequent to the receipt of said extension in the circular aperture in said block portion, wherein said spring member is captured between said tabs, thereby to prevent the disjoinder of said collar portion and said block portion, wherein said block portion includes a shoulder and wherein said spring member includes a free end engageable with said shoulder to provide the biasing force for adjusting the collar portion rotatably with respect to the block portion.

4. A mounting assembly as claimed in claim 3 wherein said block portion includes an arm extending outwardly at one side thereof, said arm including an aperture extending therethrough, and a second arm extending outwardly from the opposite side thereof, and wherein said collar portion includes an arm extending outwardly from a side thereof said last-mentioned arm and said second arm of said block portion being spaced from each other, whereby said mounting assembly may be mounted for vertical movement on a pair of spaced pins, one of which extends through the aperture in said first mentioned arm of said block portion and the other of which passes between said second arm of said block portion and the arm of said collar portion.

5. A mounting assembly for a magnetic tape head having a pole face, said mounting assembly comprising: a collar portion to which said tape head is fixedly mounted, a block portion mountable for movement along a predetermined path, said collar portion being joined to said block and rotatable with respect thereto, and a retaining spring coupled to said collar portion for securing said collar and block portions in a joined position and providing a biasing force for adjusting the rotational position of the collar portion with respect to the block portion.

6. A mounting assembly as claimed in claim 5 wherein said collar portion includes a pair of opposing tabs extending therefrom and wherein said retaining spring is compressible for receipt between said tabs, so that upon release of said compressed spring, the latter is captured therebetween to maintain said collar and block portions in a joined position.

7. A mounting assembly as claimed in claim 5 wherein said collar portion includes an extension having a circular cross-section, wherein said block portion includes a circular aperture dimensioned for receipt of said extension, said extension being rotatable in said aperture for adjusting the rotational position of said tape head, wherein said collar person includes a tab extending from said extension and wherein said block portion includes an adjustment member mounted thereon for engagement with said tab, said adjustment member being movable toward and away from said tab, against and in the direction of said biasing force, respectively, provided by said retaining spring.

8. A mounting assembly as claimed in claim 5 wherein said collar portion includes a pair of opposing tabs extending therefrom and wherein said retaining spring is deformable for engagement with said tabs thereby to secure said collar and block portions in a joined position, and wherein said retaining spring includes a portion engaging said block portion to provide the biasing force for rotating said collar portion to predetermined positions wi respect to said block portion.

* * * * *